United States Patent Office 3,551,394
Patented Dec. 29, 1970

3,551,394
MANUFACTURE OF HIGH MOLECULAR WEIGHT SUBSTANCES
Taketami Sakuragi, Tokyo, and Shinichi Akiyama, Kamakura-shi, Japan, assignors to The Japanese Geon Co., Ltd., Tokyo, Japan
No Drawing. Filed July 19, 1967, Ser. No. 654,338
Claims priority, application Japan, July 26, 1966, 41/48,515; Jan. 26, 1967, 42/4,814
Int. Cl. C08f 47/00
U.S. Cl. 260—80.7        5 Claims

ABSTRACT OF THE DISCLOSURE

A method for manufacturing a high molecular weight material by reacting an unsaturated, high molecular weight substance containing a diene as one of its constituents, and a compound having at least one functional group which contains phosphorus, sulphur or arsenic, and which is capable of reacting by addition reaction with a carbon-to-carbon double bond, with the aid of an alkyl hypohalite at a temperature between —40° C. and 120° C. The products are valuable as industrial materials or intermediates.

---

This invention relates to the manufacture of novel high molecular weight substances. In a certain aspect, the present invention is directed to a method for preparing a new high molecular weight substance by introducing various types of substituents into the carbon-carbon double bond of a high molecular weight substance having such double bond. In another aspect, the present invention relates to a method for introducing a substituent containing a functional group into the carbon-carbon double bond of a high molecular weight substance having such double bond. In still another aspect, the present invention is directed to a method for forming a chemical linkage between two high molecular weight substances individually having a carbon-carbon double bond thereby to obtain another high molecular weight substance having a greater molecular weight than that of any one of the starting high molecular weight substances.

More specifically, the present invention is characterized by:
(1) the reaction of a high molecular weight substance, e.g. an elastomer, having a carbon-carbon double bond, with a phosphorus-, sulfur- or arsenic-containing, monofunctional compound in the presence of alkyl hypohalite as coreactant, thereby to produce an elastomer having different properties than those of the starting elastomer, or an elastomer having resinous properties or a resinous material; or
(2) the reaction of an elastomer having a carbon-carbon double bond with a phosphorus-, sulfur- or arsenic-containing polyfunctional compound in the presence of alkyl hypohalite as co-reactant thereby to produce a high molecular weight substance having a substituent containing a functional group, said polyfunctional compound being used in the amount higher than its stoichiometric amount based on the alkyl hypohalite; or
(3) the reaction of two high molecular weight substances individually having a carbon-carbon double bond with a phosphorus-, sulfur- or arsenic-containing polyfunctional compound and alkyl hypohalite as co-reactant in the amount excessive to its stoichiometric amount or the reaction of a high molecular weight substance having a carbon-carbon double bond with a high molecular weight substance having at least one functional group containing phosphorus, sulfur or arsenic in the presence of alkyl hypohalite as coreactant, thereby to produce another high molecular weight substance having a molecular weight greater than that of either one of the starting materials.

In accordance with the present invention, a high molecular weight substance having a carbon-to-carbon unsaturation, e.g. natural rubber, polyisoprene, polybutadiene, butadiene-styrene copolymer, butadiene-acrylonitrile copolymer, isobutylene-isoprene copolymer, ethylene-propylene-diene copolymer, polychloroprene or the like elastomer, or polybutene or the like polyolefin which contains a minor proportion of the carbon-to-carbon unsaturation, is reacted with the after-mentioned functional compound by the aid of alkyl hypohalite as coreactant under mild conditions thereby to obtain a new high molecular weight substance having different properties than those of the starting high molecular weight substance. It is to be understood that the term "carbon-to-carbon unsaturation" used herein has the same meaning as carbon-carbon double bond.

In the present invention, the concerned reaction can proceed without exotherm and complete within a short period of time. The reaction product obtained thereby can be identified by usual chemical analytical techniques (elementary analysis, determination of carbon-carbon double bonds) and instrumental analytical techniques (IR-absorption, UV-absorption).

The reactions which will take place according to the invention may be illustrated below with reference to the use of tert.-butyl hypochlorite as coreactant.

(1) INTRODUCTION OF SUBSTITUENTS

Example A.—p-Toluenesulfonic acid

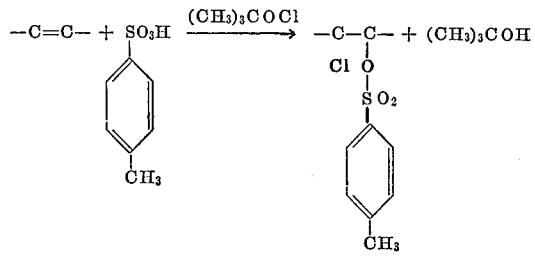

Example B.—Di-p-tolyl-phosphoric acid

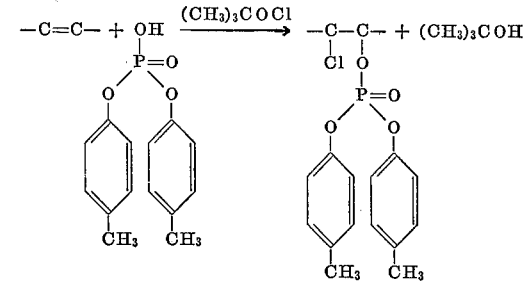

Example C.—Thioacetic acid

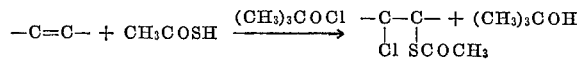

Example D.—Dithiobenzoic acid

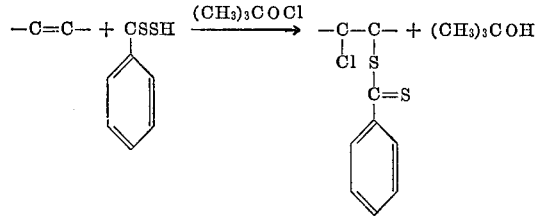

(2) INTRODUCTION OF FUNCTIONAL GROUPS

Example E.—Ortho-phosphoric acid

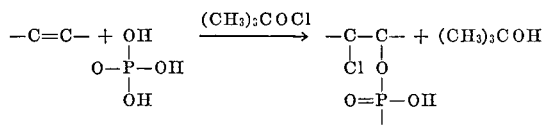

Example F.—Sulfuric acid

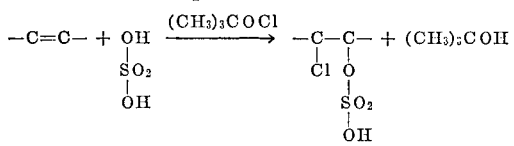

Example G.—Dithioglycolic acid

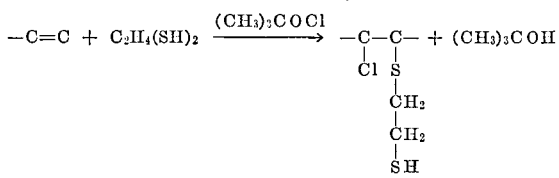

(3) LINKAGE BETWEEN MOLECULES

Example H.—Ortho-phosphoric acid

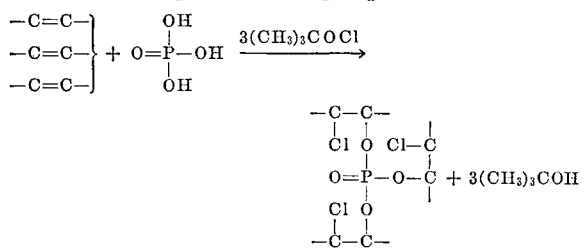

Example I.—Sulfuric acid

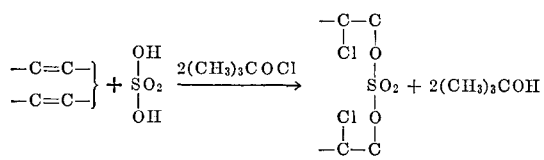

Example J.—Hydrogen sulfide

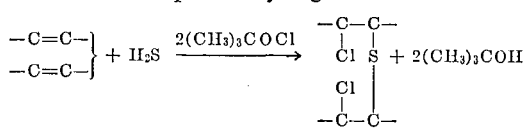

Example K.—Arsenic acid

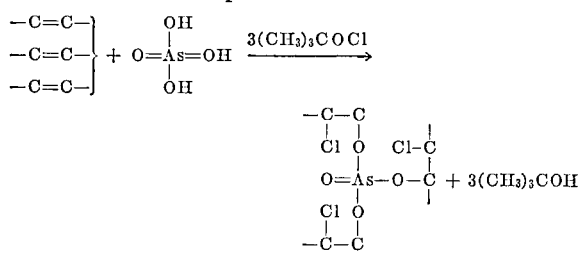

Example L.—Sulfonated polystyrene

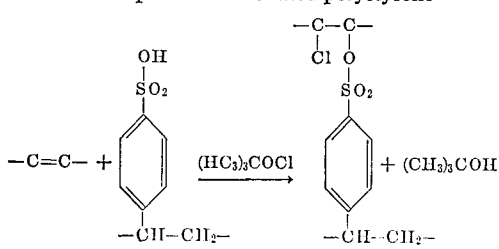

It is well known heretofore to copolymerize a diene monomer with one or more vinyl monomers in order to obtain a diene polymer having certain improved properties. Typical examples known in the art include the preparation of butadiene-styrene copolymer, butadiene-acrylonitrile copolymer, butadiene-styrene-vinylpyridine copolymer, butadiene-acrylonitrile-acrylic acid copolymer, acrylonitrile-butadiene-styrene copolymer, etc. For the preparation of diene polymers by such copolymerization method as mentioned above, however, the vinyl monomers should necessarily be copolymerizable with the monomeric dienes. This requirement disadvantageously imposes some restriction on the types of vinyl monomers which are available as reactants. Especially, monomeric vinyl esters of the phosphoric, sulfuric and arsenic acid types are found difficult to be synthesized. To the present at least, copolymerization products obtained from a diene and a vinyl ester of the phosphoric, sulfuric or arsenic acid type have not been commercially available.

In one embodiment of the invention, a high molecular weight substance having at least one carbon-to-carbon unsaturation is brought into reaction with a phosphorus-, sulfur- or arsenic-containing monofunctional compound by the aid of alkyl hypohalite as coreactant, thereby to effect addition of the substituent to the said unsaturation. The high molecular weight substance produced thereby will have a chemical structure substantially identical with or closely similar to that of a copolymerization product comprising, as its components, vinyl halide and one or more than two vinyl esters of the phosphoric, sulfuric or arsenic acid type in addition to the starting component. In this invention, the type and molecular weight of the high molecular weight substance as the starting material as well as the type and number of a substituent to be introduced can be varied widely, and accordingly, any desired products including elastomeric materials and resinous ones can be obtained.

Further, it is well appreciated in the prior art that an elastomer having one or more functional groups is an industrially very useful material because said elastomer, like carboxylated rubber, is far more excellent in adhesiveness or strength of cured product than a rubber not bearing any functional group and furthermore said elastomer is curable due to the existence of the functional group. Recently, an oil-extended, styrene-butadiene or cis-1,4-polybutadiene rubber having a high molecular weight is widely used as base stock for tyres of road vehicles. In this case, the rubber used should preferably have a molecular weight as great as possible. Cis-1,4-polybutadiene is to be prepared by solution polymerization, during which the viscosity of the resulting polymer solution remarkably increases as the molecular weight of the resultant increases. This inavoidably causes several operational difficulties, e.g. uniform stirring of the polymer solution, removal of the generated reaction heat. In case of isobutyleneisoprene rubber which is also prepared by solution polymerization techniques, the intended polymerization should be carried out at a very low temperature if a high molecular weight product is desired. Low temperature polymerization is a considerably difficult problem in commercial scale production.

In another aspect of the present invention it is possible to link two high molecular weight substances, same or different, individually having a carbon-to-carbon unsaturation. More specifically, a high molecular weight substance having a carbon-to-carbon unsaturation can be intermolecularly connected under mild conditions thereby to attain rapid increase in molecular weight. Alternatively, a high molecular weight substance having a carbon-to-carbon unsaturation is brought into reaction with another high molecular weight substance also having a C—C unsaturation, thereby to effect linking of two different high molecular weight substances. Thus, all the technical disadvantages which have been encountered in the preparation of particularly high molecular weight cis-1,4-polybutadiene or isobutylene-isoprene copolymer can be overcome by application of the techniques disclosed in the present invention. Further, linking of two different high molecular weight substances according to the invention allows us to have a new high molecular weight substance derived from any two of the known high molecular weight substances.

One important advantage of the present invention is that the reaction according to the present invention does not cause any cis-trans rearrangement of the remaining carbon-to-carbon unsaturation in the steric structure of the product. Another advantage of this invention is that a high molecular weight substance produced by linking two high molecular weight substances according to the invention has a relatively small solution viscosity (e.g. specific viscosity or intrinsic viscosity) in comparison with a plastic viscosity (e.g. Mooney viscosity).

Phosphorus-, sulfur- and arsenic-containing monofunctional compounds useful in the present invention typically include the following:

ortho-phosphoric acid diesters

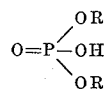

monobasic polyphosphoric acid polyesters

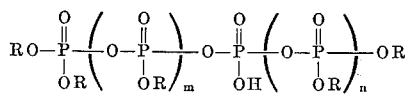

or

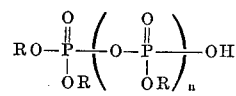

phosphorous acid diesters

phosphonic acid monoesters

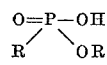

phosphonous acid monoesters

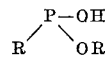

phosphinic acids

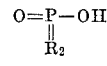

sulfuric acid monoesters

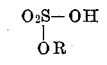

sulfurous acid monoesters

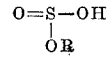

sulfonic acids

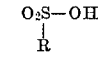

sulfinic acids

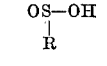

mercaptans

R—SH thioic acids

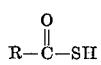

dithioic acids

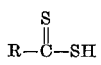

arsenic acid diesters

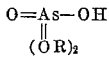

arsonic acid monoesters

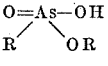

and arsinic acids

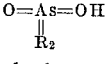

all of which may be of the low or high molecular weight. In the above formulas, the radical R represents alkyl, alkenyl, cycloalkyl, aralkyl or aryl radical. Typical specific examples of the monofunctional compounds are metaphosphoric acid, diphenyl phosphoric acid, ditolyl phosphoric acid, di-(2-ethylhexyl) phosphoric acid, diphenyl phosphorous acid, di-n-butyl phosphorous acid, dimethyl phosphinic acid, diethyl phosphinic acid, di-(2-ethylhexyl) phosphinic acid, ethyl sulfuric acid, benzenesulfonic acid, p-toluenesulfonic acid, naphthalenesulfonic acid, ethyl mercaptan, n-butyl mercaptan, monothioethylene chlorhydrin, thioacetic acid, thiopropionic acid, dithioacetic acid, dithiobenzoic acid, dimethyl arsenic acid, etc.

Phosphorus-, sulfur- and arsenic-containing polyfunctional compounds which also are useful in the invention generically are the following:

ortho-phosphoric acid $$O=P(OH)_3$$

ortho-phosphoric acid monoesters

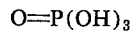

polyphosphoric acid

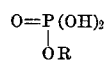

polybasic polyphosphoric acid polyesters

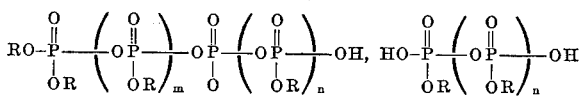

or

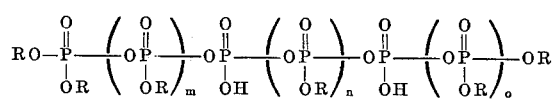

phosphorous acid $$P(OH)_3$$

phosphorous acid monoesters

phosphonic acids

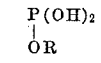

phosphonous acids

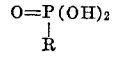

sulfuric acid $$O_2S(OH)_2$$

sulfurous acid

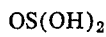

aresnic acid

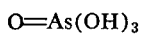

arensic acid monoesters

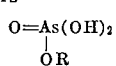

and arsonic acids

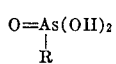

in all of which R represents alkyl, alkenyl, cycloalkyl, aralkyl or aryl radical. In addition to these polybasic acids as mentioned above, any compounds which in their molecule contain at least two functional group of the ortho-phosphoric acid diester, monobasic polyphosphoric acid, phosphorous acid diester, phosphic acid monoester phosphonous acid monoester, sulfuric acid monoester, sulfurous acid monoester, arsenic acid diester or arsonic acid monoester type, any compounds which in their molecule have at least two mercapto (—SH), thioic acid

or dithioic acid

groups, and any compounds which in their molecules have at least one mercapto, thioic acid or dithioic acid group and further at least one carboxyl or hydroxyl group are useful herein as the polyfunctional compounds, regardless their being high molecular weight or not. Typical specific examples of the polyfunctional compounds used are ortho-phosphoric acid, pyro-phosphoric acid, tri- or polyphosphoric acid, phosphorous acid, mono-(2,6,8-trimethylnonyl)-phosphoric acid, monophenyl phosphoric acid, benzenephosphonic acid methyl phosphonic acid ethyl phosphonic acid, trifluoromethyl phosphonic acid, benzenephosphonous acid, sulfuric acid, sulfurous acid, phenol-2,4-disulfonic acid, 1-naphthol-2,4-disulfonic acid, hydrogen sulfide, ethane dithiol, 1,4-butane dithiol, trithioglycerine, thioglycolic acid, thiohydroacrylic acid, thiolactic acid, thiomalic acid, monothioethylene glycol, monothiopropylene glycol, α-monothioglycerine, 1,2-dithioglycerine, 1,3 - dimercaptoacetone, arsenic acid, phenyl arsonic acid, methyl arsonic acid etc. Specific examples of the high molecular weight substances having the above-indicated functional groups are sulfonated polystyrene, phosphonated polystyrene, phosphonylated polystyrene, a polysulfide type high molecular weight compound with a terminal mercaptan group, or a compound into which at least one functional group has been introduced by the method of the invention. In carrying out the present invention in practice, these compounds usually are used in the form of organic solvent solutions. Alternatively, these compounds may be used as aqueous solutions, as the existence of small amount of water does not interfere the intended reaction.

Various alkyl hypohalites can be used in the present invention. Tertiary alkyl hypohalites, e.g. t-butyl hypohalite, t-amyl hypohalite, etc., are more preferred than n- or secondary alkyl hypohalites. Particularly preferred is t-butyl hypochlorite because of its availability.

The molar ratio between the mono- or polyfunctional compound and the alkyl hypohalite in the process of the invention should be determined depending on the type of the intended reaction.

(1) When the monofunctional compound is used to introduce a substituent into a high molecular weight substance having a carbon-to-carbon unsaturation, it is desirable to adopt the molar ratio between the monofunctional compound and the alkyl hypohalite of 1:1 or more. In this case, however, the molar ratio is not of the critical importance because the intended reaction will proceed while the substitution yield may be determined by the amount of the alkyl hypohalite added. Further, the sequence or rate of addition of the reactants into the reaction system is not so critical because the said reaction will proceed moderately unless an extraordinary high temperature is employed.

(2) When the polyfunctional compound is used to introduce a functional group into a high molecular weight substance having a carbon-to-carbon unsaturation, the alkyl hypohalite should be used in such a molar amount as equivalent to or smaller than, preferably by half, the number of the functional groups contained in said polyfunctional compound. In this case, the sequence and rate of addition of the reactants into the reaction system should be carefully adjusted so that the polyfunctional compound always exists in excess than the alkyl hypohalite in the reaction medium. In a usual practice, the polyfunctional compound is added first to the reaction medium containing the high molecular weight substance having a carbon-to-carbon unsaturation and then the resulting mixture is gradually added with the alkyl hypohalite or the solution thereof. If the alkyl hypohalite is used in stoichiometrically excessive amount to the polyfunctional compound or exists dominantly in the reaction system, undesired linking reaction will occur. The extraordinary excessive amount of the alkyl hypohalite will produce a reaction product in a gel state.

(3) Where the polyfunctional compound is used to intermolecularly link a single high molecular weight substance having a carbon-to-carbon unsaturation or a high molecular weight substance containing a functional group is used to be intermolecularly linked with a high molecular weight substance having a carbon-to-carbon unsaturation, the alkyl hypohalite should be used in the molar amount equivalent to or excessive than the number of the functional groups contained in the polyfunctional compound or in the functional high molecular weight substance. Even at the amount of less than 1 mole, e.g. 0.5 mole, of alkyl hypohalite per number of the functional groups contained in the said functional compound, it is still possible to carry out desired linking or bridging reaction effectively. However, if the said amount decreases exceedingly, the efficiency of the desired reaction will decrease remarkably. The sequence and velocity of addition of the polyfunctional compound or functional polymeric compound and the alkyl hypohalite into the reaction system are not so important factors. Usually, however, the polyfunctional compound or functional high molecular weight substance is added to the reaction medium containing the starting high molecular weight substance having a carbon-to-carbon unsaturation, and then the resulting mixture is added with the alkyl hypohalite or the solution containing same. Alternatively, the alkyl hypohalite and the polyfunctional compound or functional high molecular weight substance are gradually added to the reaction medium containing the starting high molecular weight substance having a carbon-to-carbon unsaturation.

Solvents which are used in the present invention should dissolve the starting high molecular weight substance and should be unreactive with alkyl hypohalite and the functional compound. Depending on the type of the starting high molecular weight substance, suitable solvent may be selected from the following: aliphatic hydrocarbons, e.g. heptane, hexane, cyclohexane, etc.; aromatic hydrocarbons, e.g. benzene, nitrobenzene, halogenated benzene, toluene, xylene, etc.; ethers, e.g. diethyl ether, dioxane, etc.; aliphatic esters, e.g. ethyl acetate, etc.; ketones, e.g. methyl ethyl ketone, cyclohexanone, etc.; chlorinated hydrocarbons, e.g. ethyl chloride, chloroform, carbon tetrachloride, etc.; or carbon disulfide. These solvents may be used singly or in combination. Further, any one of these solvents can be used in admixture with a tertiary alcohol, e.g. t-butyl alcohol. Since the solvent does not take any substantial part in the reaction, it is of course possible to carry out the reaction under non-solvent condition, if sufficient contact of the reactants with each other can be assured, for example, as in the case when the concerned high molecular weight substance has a relatively low molecular weight. If it is intended to have the mono- or polyfunctional compound linked to only the surface of the starting high molecular weight substance (e.g. the surface of the shaped article of the said substance), a poor solvent which does not dissolve the high molecular weight substance should be used.

In carrying out the present invention in practice, reaction temperature is not a critical factor and may vary within the wide range, e.g. from −40° C. to 120° C. or higher. Usually, a temperature of −20° C. to 80° C. is practical. At a lower temperature, the reaction velocity is slow. As in the common chemical reactions, a temperature increase will accelerate the reaction. If desired, the addition of a catalyst such as tetramethyl ammonium chloride can be made to ensure smooth progress of the reaction.

The reaction usually completes within the period of several minutes to several hours. No harmful result is observed even by continuing the reaction for a further period. The reaction product can be recovered in the known manner as by precipitation, solvent evaporation, freeze drying or steam distillation.

Alkyl hyophalide used is converted by the reaction into the corresponding alcohol, which can be recovered and then reconverted to the alkyl hypohalite for reuse if this is desired.

The thus obtained products are useful as an elastomer base stock or an oil-extended elastomer base stock. Some of these products are useful as a resin blender or processing aid (e.g. plasticizer or impact modifier), or as adhesives, varnishes and lubricating additives.

The following examples describe certain ways in which the principle of the invention has been applied, but are not to be construed as limiting its scope.

EXAMPLE 1

To 3 l. of a benzene solution containing 100 g. of cis-1,4-polybutadiene ($n_D$=1.5210) having a Mooney value of 42.3 ($ML_{1+4}$, 100° C.), 110 g. (0.41 mole) of ditolyl phosphoric acid is added. To the resulting mixture, 50 g. (0.46 mole) of t-butyl hypochlorite dissolved in 100 ml. of benzene is added. Stirring is continued at 40° C. for 3 hours. The reaction mixture is then poured into a large amount of methanol. The resulting product is separated by filtration and dried. The product is a rubbery material having a refractive index $n_D$=1.5392. This product contains 5.1% by weight of phosphorus and 5.9% by weight of chlorine, while the theoretical phosphorus and chlorine contents when calculated on assuming that the added ditolyl phosphoric acid completely reacts according to the beforementioned reaction mechanism are 5.50% and 6.30% by weight, respectively. The result of the above elementary analysis indicates that about 95% of the ditolyl phosphoric acid has actually reacted with the carbon-to-carbon unsaturation of the starting cis-1,4-polybutadiene. This is further confirmed by the fact that the product obtained by contacting 110 g. of ditolyl phosphoric acid alone with cis-1,4-polybutadiene under the substantially same conditions as above does not contain phosphorus and the refractive index of the said product remains substantially unchanged in comparison with the starting cis-1,4-polybutadiene.

Polyvinyl chloride resin (Geon 103 EP–8) is milled with (1) the reaction product of the above example, (2) cis-1,4-polybutadiene, (3) ditolyl phosphoric acid or (4) a mixture of cis-1,4-polybutadiene and ditolyl phosphoric acid (1:1.1 by weight). In each case, the impact strength of the resulting blend is measured with the following results:

TABLE 1

| Type and amount of blended material | Part | Polyvinyl chloride, part | Charpy value, kg.-cm./cm.² |
|---|---|---|---|
| None | 0 | 100 | 3.3 |
| Cis-1,4-polybutadiene | 7 | 100 | 4.2 |
| Ditolyl phosphoric acid | 7.7 | 100 | 2.1 |
| Cis-1,4-polybutadiene | 7) | 100 | 3.6 |
| Ditolyl phosphoric acid | 7.7) | | |
| Reaction product | 6.3 | 100 | 9.5 |
| Do | 10.5 | 100 | 20.0 |
| Do | 12.6 | 100 | (¹) |
| Do | 14.7 | 100 | (¹) |

¹ No crack.

Milled on rolls at 155° C. for 5 minutes and pressed at 160° C. for 10 minutes.

As apparent from the above table, the polyvinyl chloride resin blended with the reaction product is far more improved in impact strength than the same resin blended with the simple mixture of the reaction components.

EXAMPLE 2

To 500 ml. of a benzene solution containing 10 g. of cis-1,4-polybutadiene having a Mooney value of 42.3, 7 g. (0.041 mole) of para-toluenesulfonic acid dissolved in 50 ml. of tertiary butyl alcohol is added. To the resulting mixture, 5 g. (0.046 mole) of tertiary butyl hypochlorite dissolved in 50 ml. of benzene is gradually added. Stirring is continued at 40° C. for 3 hours. After completion of the reaction, the reaction mixture is poured into a large amount of methanol. The rubbery product is separated by filtration and dried.

This product contains 5.21% by weight of sulfur and 6.6% by weight of chlorine, while the theoretical values calculated on assuming that the added p-toluenesulfonic acid is reacted according to the before-indicated chemical reaction mechanism are 7.05% by weight of sulfur and 7.87% by weight of chlorine. This indicates that 75% of the added p-toluenesulfonic acid has reacted with the double bond of the cis-1,4-polybutadiene in the presence of the t-butyl hypochlorite.

This is further affirmed by the fact that when 7 g. of p-toluenesulfonic acid is brought into contact with cis-1,4-polybutadiene under the substantially same conditions the resulting product does not contain sulfur.

EXAMPLE 3

The same procedures as in Example 2 are repeated excepting that the p-toluene sulfonic acid is replaced by 9.5 g. (0.041 mole) of diphenyl phosphorous acid.

The resulting rubbery product contains 2.9% by weight of phosphorus and 6.3% by weight of chlorine, while the theoretical phosphorus and chlorine contents calculated on the assumption that the diphenyl phosphorous acid added has reacted completely with the double bond of the starting cis-1,4-polybutadiene are 6.00% by weight and 6.84% by weight, respectively. This indicates that about 50% of the added diphenyl phosphorus acid has actually reacted with the double bond of the starting cis-1,4-polybutadiene in the presence of tertiary butyl hpyochlorite. This is further affirmed by the fact that the product obtained by contacting 9.5 g. of diphenyl phosphorous acid alone with the cis-1,4-polybutadiene under the substantially same conditions does not contain phosphorus.

EXAMPLE 4

To 1 l. of a benzene solution containing 54 g. of cis-1,4-polybutadiene having a Mooney value ($ML_{1+4}$, 100° C.) of 42.3, 12.4 g. (0.2 mole) of ethyl marcaptan is added. To the resulting mixture, 27.1 g. (0.25 mole) of tertiary butyl hypochlorite dissolved in 100 ml. of benzene is gradually added at room temperature. Stirring is continued at 40° C. for about 3 hours. The reaction mixture is poured into a large amount methanol. The yellow rubbery product is obtained. This product has the sulfur and chlorine contents of 5.3% by weight and 6.9% by weight respectively, while the theoretical sulfur and chlorine contents as calculated on the assumption that the total ethyl mercaptan added has completely reacted with the double bond of the cis-1,4-polybutadiene are 8.73% by weight and 9.68% by weight, respectively. This indicates that about 60% of the added ethyl mercaptan has actually reacted with the double bond of the starting cis-1,4-polybutadiene.

EXAMPLE 5

The same procedures as in Example 4 are repeated excepting that the ethyl mercaptan is replaced by 15.2 g. (0.2 mole) of thioacetic acid. The resulting rubbery product has the sulfur and chlorine contents of 6.8% by weight and 9.5% by weight, respectively, while the theoretical sulfur and chlorine contents as calculated on the assumption that the added thioacetic acid has completely reacted according to the before-mentioned reaction mechanism are 8.41% by weight and 9.34% by weight, respectively. This indicates that about 80% of the added thioacetic acid has actually reacted with the double bond of cis-1,4-polybutadiene in the presence of tertiary butyl hypochlorite. This is further affirmed by the fact that the product obtained by contacting 15.2 g. of thioacetic acid alone with 54 g. of cis-1,4-polybutadiene does not contain sulfur and chlorine.

EXAMPLE 6

The same procedures as in Example 4 are repeated excepting that the ethyl mercaptan is replaced by 30.8 g. (0.2 mole) of dithiobenzoic acid. The resulted pink rubbery product contains 12.3% by weight of sulfur and 8.0% by weight of chlorine, while the theoretical sulfur and chlorine contents as calculated on the assumption that the added dithiobenzoic acid has completely reacted according to the before-mentioned reaction mechanism are 14.0% by weight and 7.74% by weight, respectively. This means that about 80% of the added dithiobenzoic acid has actually reacted with the double bond of this cis-1,4-polybutadiene in the presence of the tertiary butyl hypochlorite. This is further affirmed that the product obtained by contacting 30.8 g. of dithiobenzoic acid alone with 54 g. of cis-1,4-polybutadiene under the substantially same conditions does not contain sulfur and chlorine.

EXAMPLE 7

The same procedures as in Example 4 are repeated with the exception that 15.2 g. (0.2 mole) of thioacetic acid is used in place of the ethyl mercaptan and 70 g. of butadiene-styrene copolymer (styrene content: 23.5%) having a Mooney value of 68.3 is used in place of the cis-1,4-polybutadiene. The resulted rubbery product contains 6.4% by weight of sulfur and 7.2% by weight of chlorine.

EXAMPLE 8

To 3 l. of a benzene solution containing 100 g. of cis-1,4-polybutadiene having a Mooney value of 42.3, 0.8 g. (0.008 mole) of 98% sulfuric acid dissolved in 50 ml. of tertiary butyl alcohol is added. To the resulting mixture, 0.15 g. (0.0014 mole) of tertiary butyl hypochlorite dissolved in 50 ml. of benzene is gradually added. Stirring is effected at room temperature for 30 minutes. The reaction mixture is then poured into a large amount of methanol. The reaction product is separated and dried, which is a similar rubbery material having a Mooney value of 49.8 to the starting cis-1,4-polybutadiene. This product contains sulfur and chlorine as determined by elementary analysis and has 1.3 mg.-mol. of a free acid radical per 100 g. of the product as determined by titration of the dilute benzene solution with an alcoholic alkali.

The said product (100 g.) is redissolved in 2 l. of benzene, and the resulting solution is added with 2 g. (0.018 mole) of tertiary butyl hypochlorite dissolved with 50 ml. of benzene. Stirring is effected at room temperature for 30 minutes. The reaction mixture is poured into a large amount of methanol. The resulting product is separated and dried, which is a rubbery material similar to the cis-1,4-polybutadiene and having a Mooney value of 79.3. In the second stage, 100 g. of cis-1,4-polybutadiene is reacted with 0.14 g. (0.0014 mole) of 98% sulfuric acid and 2.15 g. (0.0198 mole) of tertiary butyl hypochlorite thereby to obtain a product having a Mooney value of 81.3.

From the above results it is apparent that a free acid radical of the sulfuric acid monoester type is introduced into the cis-1,4-polybutadiene molecule where sulfuric acid is used in excess to alkyl hypohalite and that the free acid radical contained in the cis-1,4-polybutadiene molecule has a capability to effect linking reaction in the presence of alkyl hypochlorite.

EXAMPLE 9

The same procedures as in Example 8 are repeated with the exception that styrene-butadiene copolymer (styrene content: 23.5%) having a Mooney value of 68.2 is used instead of the cis-1,4-polybutadiene. The product of the first stage is a rubbery material similar to the starting styrene-butadiene copolymer, said material having a Mooney value of 70.1 and containing about 1.2 mg.-mol. of a free acid radical per 100 g. of the material. The product of the second stage has a Mooney value of 80.3.

Under the same conditions, 100 g. of the styrene-butadiene copolymer is reacted with 0.14 g. (0.0014 mole) of 98% sulfuric acid and 2.15 g. (0.0198 mole) of tertiary butyl hypochlorite thereby to obtain a product having a Mooney value of 79.7.

From the above results, it is considered that a free acid radical of the sulfuric acid monoester type is introduced into the styrene-butadiene copolymer molecule and that the said free acid radical is capable of further effecting linking reaction in the presence of alkyl hypohalite.

EXAMPLE 10

The same procedures as in Example 8 are repeated with the exception that 1 g. (0.0087 mole) of 85% ortho-phosphoric acid is used instead of the 98% sulfuric acid and the amount of the tertiary butyl hypochlorite is increased to 0.2 g. (0.0018 mole). The resulted product is a rubbery material which is similar to the starting cis-1,4-polybutadiene and has a Mooney value of 57.2. This product contains phosphorous and chlorine as affirmed by elementary analysis and it contains about 2.9 mg.-mole of a free acid radical per 100 g. of the product as determined by titration of its dilute benzene solution with an alcoholic alkali.

The product (100 g.) is redissolved in 2 l. of benzene, and the resulting solution is added with 20 g. of tertiary butyl hypochlorite dissolved in 50 ml. of benzene. Stirring is continued at room temperature for 30 minutes. The reaction product is separated and dried, which is a rubbery material similar to the starting cis-1,4-polybutadiene, said material having a Mooney value of 95.2. Another product obtained by reacting 100 g. of cis-1,4-polybutadiene with 0.22 g. of 85% ortho-phosphoric acid and 220 g. of tertiary butyl hypochlorite has a Mooney value of 97.5

From the above results it is considered that if ortho-phosphoric acid in excess to alkyl hypohalite is used, a free acid radical of the ortho-phosphoric acid mono- or diester type is introduced into the cis-1,4-polybutadiene molecule and that the said radical contained in the cis-1,4-polybutadiene molecule is capable of effecting further linking reaction in the presence of alkyl hypohalite.

EXAMPLE 11

The same procedures as taken in Example 10 are repeated with the exception that a styrene-butadiene copolymer (styrene content 23.5%) having a Mooney value of 68.2 is used instead of the cis-1,4-polybutadiene.

The reaction product of the first stage is a rubbery material similar to the starting styrene-butadiene copolymer, said material having a Mooney value of 72.0 and containing about 30 mg.-mol. of a free acid radical per 100 g. of said material. The reaction product of the second stage has a Mooney value of 89.6.

Another product obtained by the reaction of 100 g. of the starting styrene-butadiene copolymer with 0.22 g. of 85% ortho-phosphoric acid and 2.20 g. of tertiary butyl hypochlorite has a Mooney value of 90.8.

From the above facts, it can be considered that a free acid radical of the ortho-phosphoric acid mono- or di-ester type is introduced into the styrene-butadiene copolymer molecule and that said radical contained in the copolymer molecule is capable of effecting further linking reaction in the presence of alkyl hypohalite.

EXAMPLE 12

(1) Three 1.5 l.-benzene solutions (A, B and C) individually containing 50 g. of cis-1,4-polybutadiene having a Mooney value of 42.3 are prepared. To the solutions A, B and C, dithioglycol is added in the amount of 0.25 g. (0.0027 mole), 0.50 g. (0.0053 mole) and 0.75 g. (0.0080 mole), respectively. Further, the solutions A, B and C are gradually added with 0.05 g. (0.00046 mole), 0.10 g. (0.00092 mole) and 0.15 g. (0.0014 mole) respectively, of tertiary butyl hypochlorite dissolved in 100 ml. of benzene. Stirring is continued at room temperature for 3 hours. The reaction mixtures are individually poured into the large amounts of methanol. The products A, B and C are rubbery materials similar to the starting cis-1,4-polybutadiene. Their Mooney values are set forth in Table 2–I. All these products contain sulfur as confirmed by elementary analysis.

(2) The above-obtained three products are redissolved into each 100 ml. of benzene. To the resulting solutions A, B and C, 0.15 g. (0.0014 mole), 0.30 g. (0.0028 mole) and 0.45 g. (0.0042 mole), respectively, of tertiary butyl hypochlorite dissolved in each 50 ml. of benzene is gradually added at room temperature. Stirring is continued at 40° C. for 3 hours. The respective reaction mixtures are poured into the large amounts of methanol. The resulting rubbery products have the Mooney values as set forth in Table 2–II.

TABLE 2

| Amount of t-butyl hypochlorite added in (1) per 100 g. of rubber | Mooney value of products (ML$_{1+4}$, 100° C.) | |
|---|---|---|
| | I | II |
| (A) 0.10 g. (0.00092 mole) | 40.0 | 55.7 |
| (B) 0.20 g. (0.00184 mole) | 39.3 | 80.0 |
| (C) 0.30 g. (0.00276 mole) | 48.2 | 93.4 |

As apparent from the above, the reaction product of the first stage where an excess of dithioglycol exists above the amount of t-butyl hypochlorite has a free mercapto radical introduced therein and the reaction product of the second stage where the said first stage product is contacted with t-butyl hypochlorite alone has the mercapto radical interconnected between two polymer molecules. This can be confirmed by a comparison test wherein 50 g. of cis-1,4-polybutadiene is brought into reaction with 0.13 g. (0.0014 mole) of dithioglycol and 0.60 g. (0.0056 mole) of t-butyl hypochlorite thereby to obtain a rubbery material having a Mooney value of 95.7.

EXAMPLE 13

The same procedures as in Example 12 (1) and (2) are repeated with the exception that 50 g. of butadiene-styrene copolymer (styrene content 23.5%) having a Mooney value 68.3 is used instead of the cis-1,4-polybutadiene. Mooney values of the reaction products of the first and second stages are shown in Table 3.

TABLE 3

| Amount of the t-butyl hypochlorite added in the first stage per 100 g. of the rubber | Mooney value of the reaction products (ML$_{1+4}$, 100° C.) | |
|---|---|---|
| | I | II |
| 0.10 g. (0.00092 mole) | 70.1 | 87.0 |
| 0.20 g. (0.00184 mole) | 72.6 | 122.0 |
| 0.30 g. (0.00276 mole) | 77.9 | 131.2 |

For comparison, 50 g. of the butadiene-styrene copolymer is reacted with 0.13 g. (0.0014 mole) of dithioglycol and 0.60 g. (0.0056 mole) of t-butyl hypochlorite thereby to obtain a rubbery product having a Mooney value of 137.0.

EXAMPLE 14

The same procedures as in Example 12 (1) and (2) are repeated with the exception that 0.25 g. (0.0027 mole), 0.50 g. (0.0054 mole) or 0.75 g. (0.0082 mole) of thioglycolic acid is used instead of the corresponding amount of the dithioglycolic acid. The resulted rubbery products have the Mooney values as shown in Table 4.

TABLE 4

| Amount of the t-butyl hypochlorite added in the first stage per 100 g. of the rubber | Mooney value fo the reaction products (ML$_{1+4}$, 100° C.) | |
|---|---|---|
| | I | II |
| 0.10 g. (0.00092 mole) | 43.0 | 52.7 |
| 0.20 g. (0.00184 mole) | 50.2 | 77.3 |
| 0.30 g. (0.00276 mole) | 55.3 | 95.2 |

For comparison, 50 g. of the cis-1,4-polybutadiene is reacted with 0.13 g. (0.0014 mole) of thioglycolic acid and 0.60 g. (0.0056 mole) of t-butyl hypochlorite thereby to obtain a rubbery product having a Mooney value of 94.2.

EXAMPLE 15

(1) Three 1.5 l.-benzene solutions A, B and C individually containing 50 g. of cis-1,4-polybutadiene having a Mooney value of 42.3 are prepared. To these solutions A, B and C, t-butyl hypochlorite is added in the amount of 2 g. (0.0185 mole), 4 g. (0.037 mole) and 10 g. (0.092 mole), respectively. All of these solutions are slowly bubbled with more than 0.5 mole of hydrogen sulfide gas. Stirring is made at room temperature for 3 hours. The reaction mixtures are individually poured into the large amounts of methanol. Mooney values of the individual reaction products A, B and C which are rubbery and which contain sulfur are set forth in Table 5–I.

(2) The reaction products A and B of the first stage are redissolved in each 1 l. of benzene. To the solutions obtained, 4 g. (0.037 mole) and 8 g. (0.074 mole), respectively, of t-butyl hypochlorite dissolved in 100 ml. of benzene is added gradually at room temperature. Stirring is made at room temperature for 3 hours. The individual reaction mixtures are poured into the large amounts of methanol to obtain rubbery materials which have the Mooney values as set forth in Table 5–II.

TABLE 5

| Amount of the t-butyl hypochlorite added in the first stage per 100 g. of the rubber | Mooney value of the reaction products (ML$_{1+4}$, 100° C.) | |
|---|---|---|
| | I | II |
| 4 g. (0.037 mole) | 47.5 | 75.0 |
| 8 g. (0.074 mole) | 78.3 | 123.1 |
| 20 g. (0.184 mole) | 129.0 | |

From the above results it is apparent that the reaction to interconnect the cis-1,4-polybutadiene molecules takes place in the first stage comprising bubbling of gaseous hydrogen sulfide in the presence of t-butyl hypochlorite.

Further, the fact that the reaction product of the second stage has an increased Mooney viscosity affirms the existence of a free mercapto radical which has been introduced in the reaction product of the first stage.

EXAMPLE 16

To a 3 l.-benzene solution containing 100 g. of cis-1,4-polybutadiene having a Mooney value of 42.3, 1.5 g. (0.015 mole) of 98% sulfuric acid dissolved in 300 ml. of butyl alcohol is added. To the resulting mixture, 9 g. (0.085 mole) of t-butyl hypochlorite dissolved in 300 ml. of benzene is gradually added. Stirring is made at room temperature for 3 hours. The reaction mixture is poured into the large amount of methanol. The reaction product is separated and dried, which is a rubbery material having a Mooney value of 140.0. The reaction product has the sulfur and chlorine contents of 0.40% by weight and 0.95% by weight, respectively, whereas the theoretical contents as calculated on the assumption that the added sulfuric acid has completely reacted according to the before-indicated reaction mechanism are 0.46% by weight of sulfur and 1.02% by weight of chlorine. This means that two functional groups of the added sulfuric acid has actually reacted at the reaction ratio of about 90% to interconnect between the double bonds of the cis-1,4-polybutadiene molecules. This is further confirmed by the fact that the individual products obtained by contacting cis-1,4-polybutadiene with 1.5 g. of 98% sulfuric acid or with 9 g. of t-butyl hypochlorite are rubbery materials substantially similar to cis-1,4-polybutadiene and neither contain sulfur nor chlorine.

EXAMPLES 17–22

The same procedures as in Example 16 are repeated with the exception that the 98% sulfuric acid is used in varying amounts and the butyl hypochlorite is used in the amount of five times by weight of said sulfuric acid. Mooney values of the resulting rubbery products (Examples 17–22) and of control samples obtained by individually contacting the starting cis-1,4-polybutadiene with 20 g. of 98% sulfuric acid or with 10 g. of t-butyl hypochlorite are set forth in Table 6.

TABLE 6

| | Added amount (g./100 g. rubber) | | Mooney value (ML$_{1+4}$, 100° C.) |
|---|---|---|---|
| | 98% H$_2$SO$_4$ | t-Butyl hypochlorite | |
| Starting cis-1,4-polybutadiene. | 0 | 0 | 42.3 |
| Control sample 1 | 20 | 0 | 45.2 |
| Control sample 2 | 0 | 100 | 41.9 |
| Example 17 | 0.06(0.0006 mole) | 0.30(0.0028 mole) | 60.0 |
| Example 18 | 0.10(0.001 mole) | 0.50(0.0046 mole) | 72.0 |
| Example 19 | 0.14(0.001 mole) | 0.70(0.0065 mole) | 83.5 |
| Example 20 | 0.20(0.002 mole) | 1.00(0.0092 mole) | 100.1 |
| Example 21 | 1.0(0.010 mole) | 5.00(0.046 mole) | 124.5 |
| Example 22 | 2.0(0.020 mole) | 10.0(0.092 mole) | 149.0 |

From the above results it is apparent that the added sulfuric acid has reacted in the presence of t-butyl hypochlorite thereby to interconnect between the cis-1,4-polybutadiene molecules.

EXAMPLE 23

The same procedures as in Example 16 are repeated with the exception that 1.5 g. (0.013 mole) of 85% ortho-phosphoric acid is used instead of the 98% sulfuric acid. A rubbery material having a Mooney value of 151.3 is obtained. This product contains 0.31% by weight of phosphorus and 1.03% by weight of chlorine, whereas the theoretical phosphorus and chlorine contents as calculated on the assumption that the added ortho-phosphoric acid has completely reacted according to the beforementioned reaction mechanism are 0.36% by weight and 1.07% by weight, respectively. This means that three functional groups of the ortho-phosphoric acid in the presence of t-butyl hypochlorite have actually reacted at the reaction ratio of about 90% thereby to interconnect between the double bond of the cis-1,4-polybutadiene molecules. On the other hand, the products individually obtained by contacting the cis-1,4-polybutadiene with 1.5 g. of 85% ortho-phosphoric acid or with 9 g. of t-butyl hypochlorite are rubbery materials which are substantially indifferent from the cis-1,4-polybutadiene and which neither contain phosphorus nor chlorine.

EXAMPLES 24–31

The same procedures as in Example 23 are repeated with the exception that the 85% ortho-phosphoric acid is used in the varying amounts and the t-butyl hypochlorite is used in the amount corresponding to seven times by weight of the ortho-phosphoric acid used. Mooney values of the resulted rubbery products (Examples 24–31) and of the control samples 3 and 4 individually obtained by contacting the cis-1,4-polybutadiene with 2 g. of 85% ortho-phosphoric acid or with 14 g. of t-butyl hypochlorite are set forth in Table 7.

TABLE 7

| | Added amount (g./100 g. rubber) | | Mooney value (ML$_{1+4}$, 100° C.) |
|---|---|---|---|
| | 85% orthophosphoric acid | t-Butyl hypochlorite | |
| Starting cis-1,4-polybutadiene. | 0 | 0 | 42.3 |
| Control sample 3 | 20 | 0 | 43.8 |
| Control sample 4 | 0 | 14.0 | 42.7 |
| Example 24 | 0.06(0.00052 mole) | 0.42(0.0039 mole) | 56.5 |
| Example 25 | 0.10(0.00087 mole) | 0.72(0.0065 mole) | 75.5 |
| Example 26 | 0.14(0.00111 mole) | 0.98(0.0090 mole) | 87.0 |
| Example 27 | 0.20(0.00174 mole) | 1.4(0.0129 mole) | 96.0 |
| Example 28 | 0.40(0.00348 mole) | 2.8(0.0258 mole) | 118.4 |
| Example 29 | 0.60(0.0052 mole) | 4.2(0.0388 mole) | 123.0 |
| Example 30 | 1.0(0.0087 mole) | 7.0(0.0645 mole) | 143.8 |
| Example 31 | 2.0(0.0174 mole) | 14.0(0.129 mole) | 161.5 |

As apparent from the above table, the added ortho-phosphoric acid has actually reacted in the presence of t-butyl hypochlorite thereby to interconnect the cis-1,4-polybutadiene molecules.

EXAMPLES 32–34

The same procedures as in Example 16 are repeated with the exception that 50% phosphorous acid in varying amounts is used instead of the 98% sulfuric acid and the t-butyl hypochlorite is used in the amount corresponding to about twice by weight of the ortho-phosphoric acid. Mooney values of the resulted rubbery products (Examples 32–34) and of the control sample 5 obtained by contacting the cis-1,4-polybutadiene with 0.6 g. of 50% phosphorous acid are set forth in Table 8.

TABLE 8

| | Added amount (g./100 g. rubber) | | Mooney value (ML$_{1+4}$, 100° C.) |
|---|---|---|---|
| | 50% phosphorous acid | t-Butyl hypochlorite | |
| Cis-1,4-polybutadiene. | 0 | 0 | 42.3 |
| Control sample 5 | 0.6 | 0 | 44.0 |
| Example 32 | 0.2(0.00122 mole) | 0.4(0.0037 mole) | 54.6 |
| Example 33 | 0.4(0.00244 mole) | 0.8(0.0074 mole) | 76.1 |
| Example 34 | 0.6(0.00366 mole) | 1.2(0.0111 mole) | 91.7 |

From the above table, it is apparent that the added phosphorous acid has reacted in the presence of the t-butyl hypochlorite thereby to interconnect between the cis-1,4-polybutadiene molecules.

EXAMPLE 35

50 g. of the reaction product of the first stage of Example 8 (i.e. the modified cis-1,4-polybutadiene having a Mooney value of 49.8 and containing a free sulfuric acid radical) and 50 g. of the styrene-butadiene copolymer (styrene content 23.5%, Mooney value 68.2) are dissolved in 2 l. of benzene. To the resulting solution, 2 g. (0.011 mole) of t-butyl hypochlorite dissolved in 100 ml. of benzene is added. Stirring is made at 40° C. for 30 minutes. Steam vapor is passed into the reaction mixture. The reaction product is separated and dried to have a rubbery material having a Mooney value of 82.5. On the other hand, the 50:50 mixture of the said modified cis-1,4-polybutadiene with the said styrene-butadiene copolymer has a Mooney value of 57.1. Further, 50 g. of the modified cis-1,4-polybutadiene is treated with 2 g. of t-butyl hypochlorite and then simply mixed with 50 g. of the styrene-butadiene copolymer thereby to have a mixture having a Mooney value of 73.0. From these tests it can be considered that the modified cis-1,4-polybutadiene having a free sulfuric acid radical introduced therein has been bonded with the styrene-butadiene copolymer by mixing both together.

EXAMPLE 36

(1) Three solutions A, B and C are prepared individually by 50 g. of cis-1,4-polybutadiene having a Mooney value of 42.5 in 1.5 l. of carbon disulfide. To each of these solutions hydrogen sulfide gas is passed for 3 hours at the rate of about 30 ml./min. To the solutions A, B and C, t-butyl hypochlorite is added in the amount of 2.2. g. (0.02 mole), 3.3 g. (0.03 mole) and 4.3 g. (0.04 mole), respectively, in the form of solution dissolved in 50 ml. of carbon disulfide. Stirring is made at room temperature for 3 hours. By repeating the substantially same treatment as in Example 15, rubbery products in each case are obtained, which have Mooney values as set forth in Table 9–I.

(2) The same procedures as in Example 15 are repeated with the exception that the t-butyl hypochlorite is used in the varying amounts of 4.3 g. (0.04 mole), 6.5 g. (0.06 mole) and 8.7 g. (0.08 mole). The resulted rubbery products have Mooney values as set forth in Table 9–II.

TABLE 9

| Amount of t-butyl hypochlorite added in the first stage (per 100 g. rubber) | Mooney value of the reaction product ($ML_{1+4}$, 100° C.) | |
| --- | --- | --- |
| | I | II |
| (A) 4.4 g. (0.04 mole) | 58.0 | 88.5 |
| (B) 6.6 g. (0.06 mole) | 61.0 | 107.0 |
| (C) 8.6 g. (0.08 mole) | 88.5 | 132.1 |

EXAMPLES 37–39

To a solution containing 100 g. of cis-1,4-polybutadiene (Mooney value 42.3) in 2 l. of benzene, arsenic acid dissolved in warmed t-butyl alcohol is added in varying amounts. Tertiary butyl hypochlorite is used in the amount corresponding to 3.5 times by weight of the arsenic acid used and is added in the form of solution dissolved in 300 ml. of benzene. The resulting reaction mixture in each case is poured into a large amount of methanol, thereby to recover a rubbery material. Mooney values of the resulted products (Examples 37–39) and a control sample 6 obtained by contacting the cis-1,4-polybutadiene with 10 g. of arsenic acid alone are set forth in Table 10.

TABLE 10

| | Added amount (g./100 g. rubber) | | Mooney value $ML_{1+4}$, 100° C.) |
| --- | --- | --- | --- |
| | Arsenic acid | t-butyl hypochlorite | |
| Cis-1,4-polybutadiene. | 0 | 0 | 42.3 |
| Control sample 6 | 10 | 0 | 43.1 |
| Example 37 | 5 (0.0352 mole) | 17.5 (0.161 mole) | 57.5 |
| Example 38 | 7 (0.0493 mole) | 24.5 (0.226 mole) | 85.0 |
| Example 39 | 10 (0.0704 mole) | 35 (0.322 mole) | 114.3 |

From the above result, it is apparent that the added arsenic acid has reacted in the presence of t-butyl hypochlorite thereby to interconnect the cis-1,4-polybutadiene molecules.

EXAMPLES 40–41

The same procedures as in Examples 37–39 are repeated with the exception that varying amounts of phenyl arsonic acid is used instead of the arsenic acid and the t-butyl hypochlorite is used in the amount corresponding to 2.5 times (by weight) of the phenyl arsonic acid used. Mooney values of the resulted rubbery products (Examples 40–41) and of a control sample 7 obtained by contacting the cis-1,4-polybutadiene with 10 g. of phenyl arsonic acid alone are set forth in Table II.

TABLE 11

| | Added amount (g./100 g. rubber) | | Mooney value ($ML_{1+4}$, 100° C.) |
| --- | --- | --- | --- |
| | Phenyl arsonic acid | t-butyl hypochlorite | |
| Cis-1,4-polybutadiene. | 0 | 0 | 42.3 |
| Control sample 7 | 100 | 0 | 43.5 |
| Example 40 | 7.7 (0.0354 mole) | 19.3 (0.178 mole) | 58.5 |
| Example 41 | 100 (0.046 mole) | 25.0 (0.230 mole) | 61.9 |

From the above result, it is apparent that the added phenyl arsonic acid has reacted in the presence of t-butyl hypochlorite thereby to interconnect the cis-1,4-polybutadiene molecules.

EXAMPLE 42

50 g. of cis-1,4-polybutadiene (Mooney value 42.3) and 50 g. of styrene-butadiene copolymer (styrene content 23.5%, Mooney value 68.2) are dissolved in 2 l. of benzene. To this solution, 0.14 g. (0.0014 mole) of 98% sulfuric acid dissolved in 300 ml. of t-butyl alcohol is added. Further, 2.2 g. (0.020 mole) of t-butyl hypochlorite dissolved in 100 ml. of benzene is gradually added. Stirring is made at 40° C. for 30 minutes. Thereafter, steam vapor is passed into the reaction mixture. The reaction product is separated and dried as a rubbery material having a Mooney value of 84.3.

On the other hand, 50 g. of the same cis-1,4-polybutadiene is treated with 0.14 g. of the sulfuric acid and 2.2 g. of the t-butyl hypochlorite and then mixed with 50 g. of the styrene-butadiene copolymer thereby to obtain a product having a Mooney value of 92.5. Further, 50 g. of the styrene-butadiene copolymer is treated with 0.14 g. of sulfuric acid and 2.2 g. of t-butyl hypochlorite and then mixed with 50 g. of the cis-1,4-polybutadiene thereby to obtain a product having a Mooney value of 62.7. Still further, 100 g. each of the cis-1,4-polybutadiene and the styrene-butadiene copolymer are separately treated with 0.14 g. of the sulfuric acid and 2.2 g. of the t-butyl hypochlorite and then mixed together thereby to obtain a product having a Mooney value of 73.2.

From the results of these comparative tests, it is apparent that the cis-1,4-polybutadiene and styrene-butadiene copolymer are intermolecularly connected according to the method of the present invention.

EXAMPLE 43

The same procedures as in Example 42 are repeated with the exception that 0.22 g. of 85% phosphoric acid is used instead of the 98% sulfuric acid. When the mixture of cis-1,4-polybutadiene and styrene-butadiene copolymer is treated, a rubbery material having a Mooney value of 105.5 is obtained. When the cis-1,4-polybutadiene alone is treated and then mixed with the styrene-butadiene copolymer, a rubbery material having a Mooney value of 117.8 is obtained. Further, when the styrene-butadiene copolymer alone is treated and then mixed with the cis-1,4-polybutadiene, a rubbery material having a Mooney value of 73.1 is obtained. Still further, when the cis-1,4-polybutadiene and the styrene-butadiene copolymer are separately treated and then mixed together, a rubbery material having a Mooney value of 96.3 is obtained.

From the results of a series of these experiments, it is apparent that the cis-1,4-polybutadiene and the styrene-butadiene copolymer can be intermolecularly bonded together according to the method of the present invention.

What we claim is:

1. A method for the manufacture of a novel high molecular weight material which comprises reacting an unsaturated high molecular weight substance containing a diene as one of its constituents; and being selected from the group consisting of natural rubber, polybutadiene, polyisoprene, butadiene-styrene copolymer, butadiene acrylonitrile copolymer, ethylene-propylene-diene copolymer, isobutylene-diene copolymer and polychloroprene, with a compound having at least one functional group, and which contains phosphorus, sulfur or arsenic, said compound being (a) a monofunctional compound selected from the group consisting of ortho-phosphoric acid diesters, monobasic polyphosphoric acid polyesters, phosphorus acid diesters, phosphonic acid monoesters, phosphonous acid monoesters, phosphinic acids, sulfuric acid monoesters, sulfurous acid monoesters, sulfinic acids, mercaptans, thioic acids, dithioic acids, arsinic acid diesters, arsonic acid monoesters and arsinic acids; (b) or a polyfunctional compound selected from the group consisting of orthophosphoric acid, orthophosphoric acid monoesters, polyphosphoric acid, polybasic polyphosphoric acid polyesters, phosphorus acid, phosphorus acid monoesters, phosphonic acids, phosphonous acids, sulfuric acid, sulfurous acid, arsenic acid, arsenic acid monoesters and arsonic acids; said reacting being effected with the aid of an alkyl hypohalite at a temperature between —40° and 120° C.

2. A method as claimed in claim 1, wherein the compound has one functional group, and the resulting material is a high molecular weight material having a substituent introduced into the diene of the starting high molecular weight substance, said substituent not containing any functional group.

3. A method as claimed in claim 1, wherein the compound is a polyfunctional compound and said alkyl hypohalite is used in an amount of not more than 1.0 mole for each of the functional groups contained in said polyfunctional compound, and the resulting material is a high molecular weight material having a substituent introduced into the diene of the starting high molecular substance, said substituent containing a free functional group.

4. A method as claimed in claim 1, wherein the compound is a polyfunctional compound and said alkyl hypohalite is used in an amount of not less than 1.0 mole for each of the functional groups contained in said polyfunctional compound, and an intermolecular chemical linkage of the starting high molecular weight material is formed to produce a different high molecular weight substance having a greater molecular weight than that of the starting material.

5. A method as claimed in claim 1, wherein the alkyl hypohalite is tertiary butyl hypohalite.

References Cited
UNITED STATES PATENTS

| | | | |
|---|---|---|---|
| 2,376,027 | 5/1945 | Bouchard | 260—772 |
| 2,633,478 | 3/1953 | Gross | 260—772 |
| 3,023,180 | 2/1962 | Canteriho et al. | 260—27 |
| 3,033,832 | 5/1962 | Serniuk et al. | 260—78.4 |
| 3,278,467 | 10/1966 | Burke et al. | 260—3.5 |
| 3,402,136 | 9/1968 | Sakuragi et al. | 260—23.7 |

JOSEPH L. SCHOFER, Primary Examiner

S. M. LEVIN, Assistant Examiner

U.S. Cl. X.R.

260—82.1, 82.3, 83.7, 85.3, 92.3, 93.7, 94,2, 94.9, 768, 769, 888, 887, 890, 894